United States Patent
Kuyt

[11] 3,733,481
[45] May 15, 1973

[54] FIBER OPTICS LIGHT SOURCE

[75] Inventor: Frits Kuyt, Rochester, N.Y.

[73] Assignee: Bausch & Lomb Incorporated, Rochester, N.Y.

[22] Filed: June 11, 1970

[21] Appl. No.: 45,367

[52] U.S. Cl................240/47, 240/1 EL, 240/41.15, 350/96 B
[51] Int. Cl...............................................F21v 29/00
[58] Field of Search......................240/1 R, 1 EL, 4, 240/1.4, 2 R, 47, 41.15; 350/96 B

[56] References Cited

UNITED STATES PATENTS

| | | | |
|---|---|---|---|
| 1,930,993 | 10/1933 | Blodgett | 240/1.4 X |
| 3,382,353 | 5/1968 | Wappler | 240/1 EL |
| 3,596,083 | 7/1971 | Lovering | 240/1 EL |
| 3,180,981 | 4/1965 | Ulffers | 240/47 |
| 3,397,457 | 8/1968 | Gosselin | 240/41.5 X |
| 3,506,820 | 4/1970 | Shannon | 240/4 |

Primary Examiner—Samuel S. Matthews
Assistant Examiner—Richard L. Moses
Attorney—Frank C. Parker

[57] ABSTRACT

A fiber optics light source of compact, flat configuration comprises a narrow lamphouse including lamp, reflector and condenser aligned for focusing into the receiving end of a fiber optics bundle, and an air impeller mounted laterally of the lamphouse to direct air over the lamp for dissipating heat buildup. The light source may be built into a dental chair or the like, or it may be a separate module.

1 Claim, 5 Drawing Figures

FRITS KUYT
INVENTOR.

FRITS KUYT
*INVENTOR.*

BY *Frank C. Parker*
ATTORNEY

FRITS KUYT
INVENTOR.

3,733,481

FIBER OPTICS LIGHT SOURCE

BACKGROUND OF THE INVENTION (1) Field of the Invention

The field of my invention is illuminating devices and more specifically light sources for fiber optics or clad-rod light conduits.

(2) Description of the Prior Art

Practitioners of the healing arts have always complained of the lack of light available when probing into their patient's body cavities and until the advent of fiber optics light conduits there have been no very satisfactory solutions. Batteries of operating room lights are often employed and they are suitable for general illumination. Unfortunately, such lights are very bright and often cause discomfort to a patient who remains conscious during the procedures requiring such illumination. Additionally, the benefit of such lamps is often lost when the practitioner's shadow is cast over the critical area, particularly if that area is a body cavity. It is not satisfactory to employ auxiliary lighting fixtures beneath the practitioner since these are bulky and hot and tend to get in the practitioner's way. Fiber optics illuminators, then, being small, cool, and flexible offer a unique solution for this requirement.

If fiber optics, or clad-rod, illumination is to be employed, however, it is necessary that a suitable light source be made available close at hand since the loss of light through a length of light conduit increases with distance and becomes quite significant in relatively few feet. Accordingly, it would become necessary to bring a light source, with its heat and bulk, close to the patient.

Existing light sources for fiber optics light conduits are made for mounting on a floor or table. Therefore, much of the advantage which fiber optics gives the health practitioner is offset by the need to contend with the light source, which tends to get under foot and which often emits heat, noises and vibrations.

SUMMARY OF THE INVENTION

Accordingly, I have invented an extremely compact and convenient light source for fiber optics or clad-rod light conduits which is so small that it may be combined with and structurally encased in a chair for supporting a patient during examination, but which yet has all the requisites and power of conventional light sources. A high-intensity lamp which is also compact in size, particularly in the width of its envelope, such as a quartz-halogen lamp is mounted in a compact lamphouse which also carries prealigned auxiliary optics, a condensing lens system and a light reflecting, heat transmitting mirror for augmenting the lamp's basic illumination. The lamphouse mounting bracket is positioned to focus the light into the receiving end of a fiber optics light conduit. Heat baffles in the lamphouse are aligned with an airflow path to permit rapid dissipation of heat from the lamp. The airflow is generated by an almost noiseless and vibration free, compact air impeller mounted in an expanding spiral frame for guiding the airflow over the lamp and out an exhaust port. Means are also provided for furnishing light to an auxiliary light conduit which may be required for special purposes.

BRIEF DESCRIPTION OF THE DRAWINGS

In the drawings,

In FIG. 1 is shown the back 10 of a patient supporting chair, as for instance, a dental chair. The back section comprises a metal frame 12, a removable cover 14, and an upholstery covered body 16. By operating controls on a control panel 18, the practitioner may raise and lower the patient as his procedures may require. A fiber optics light source unit 20 is attached by means of brackets 22 to the body of the chair back. The cover 24 of the light source unit may be readily removed over studs 26 for servicing of the components beneath.

Figure 1:
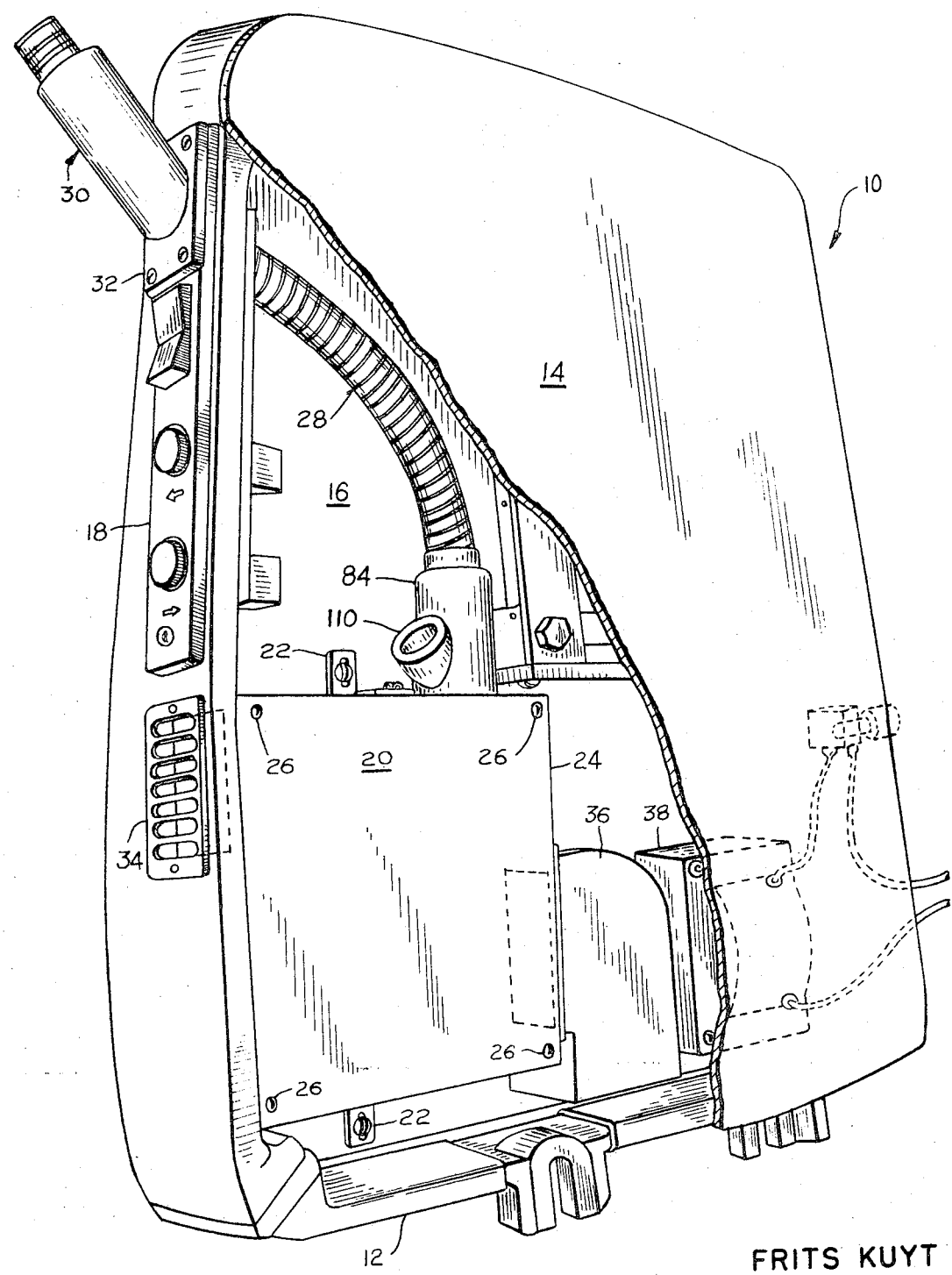
FIG. 1 is a perspective view of a chair back, partly cut away, showing a fiber optics light source according to my invention built into the enclosed part thereof.

Light generated within the light source unit is transmitted for illumination of the patient by means of a fiber optics bundle enclosed in a semi-rigid shield 28 having the properties of protecting the light carrying bundle beneath it and of holding the bundle yieldingly where illumination is desired. The fiber optics bundle so enclosed passes through the frame 12 by means of a sleeve 30 fastened on the frame by any suitable means such as screws 32. An air inlet 34 is formed in the frame 12 to permit cooling air to be drawn into the unit. The air is expelled through air duct 36.

Electricity for the lamp is furnished by means of transformer 38 connected by suitable means to line current which may be activated by means of switch 40, remotely located on the frame 12.

Figure 2:
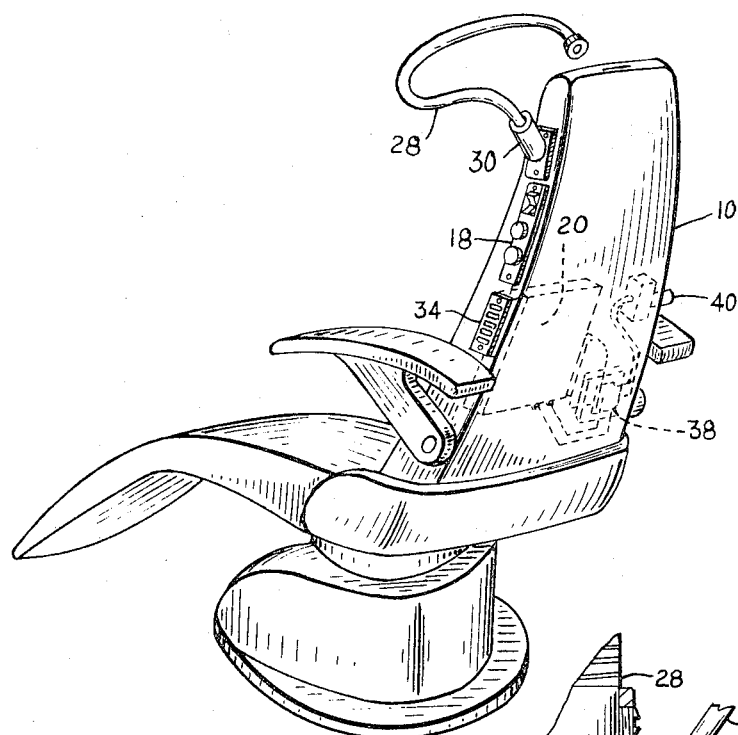
FIG. 2 is a perspective view of a complete practitioner's chair showing such a light source in hidden lines.
Figure 3:
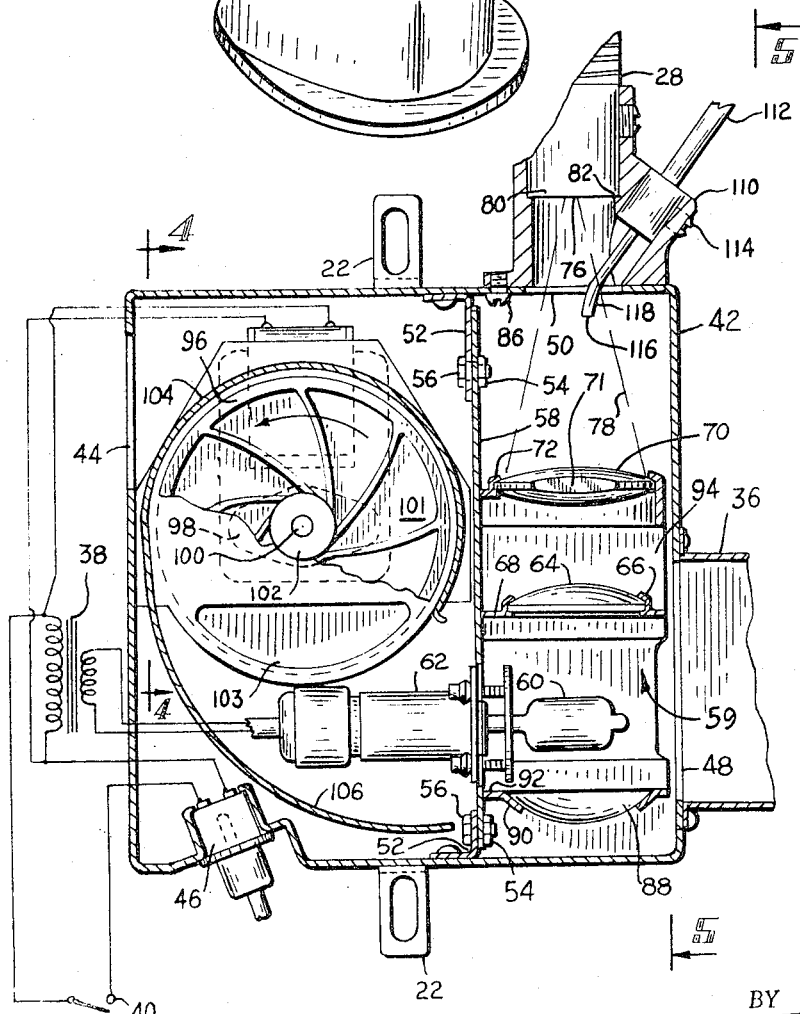
FIG. 3 is a plan view, partly in section, of another embodiment of the invention, a compact fiber optics light source unit separate from a practitioner's chair, with the cover removed, partly in diagram, and with the air impeller partly cut away.
Figure 5:
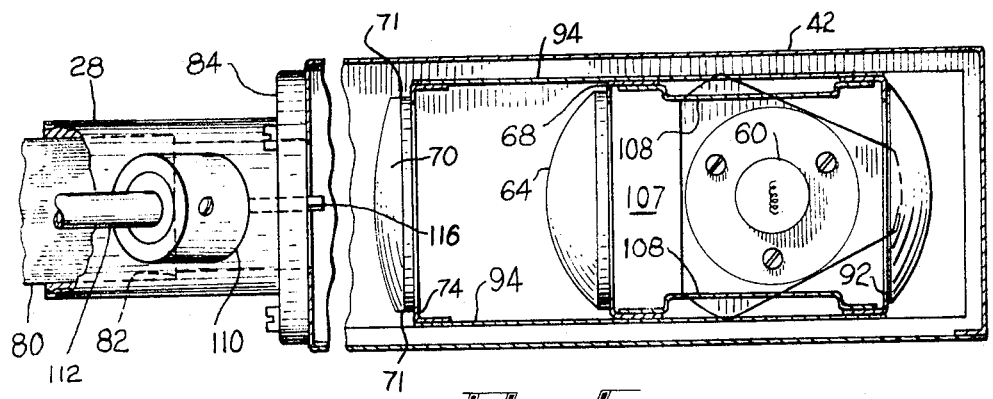
FIGS. 4 and 5 are sectional views along lines 4—4 and 5—5 of FIG. 3, respectively.
Figure 4:
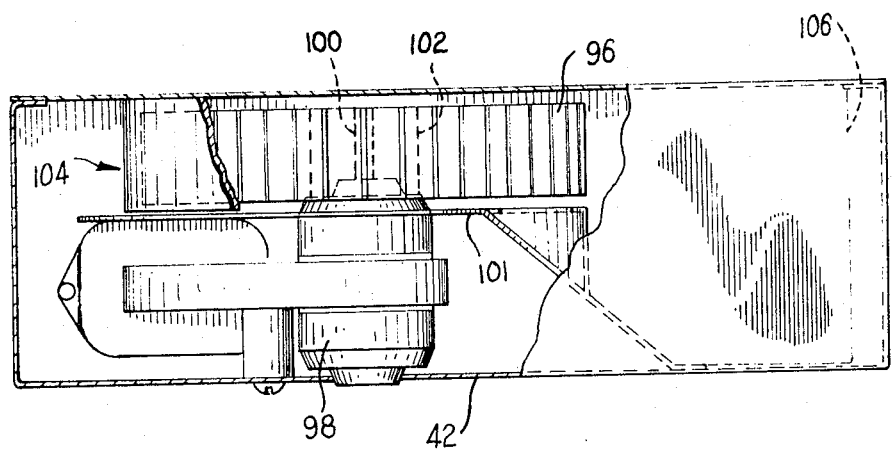

A compact light source unit, suitable for attachment to an existing practitioner's chair, is shown in FIG. 3. Its interior components are essentially the same as those of the unit of FIGS. 1 and 2 and accordingly the following description may be taken as applicable to both.

A case 42 encloses the working components of the light source unit. In the walls of the case are air inlet port 44, an electrical connector 46, an air outlet port 48 and a light outlet 50. Lamphouse mounting tabs 52 extend inwardly from the walls of the case. Slide fasteners 54 engage with studs 56 to hold lamphouse mounting bracket 58 in alignment for maximizing the luminance. Lamp 60 is twistably inserted in socket 62 whose mounting on lamphouse mounting bracket 58 is calculated to bring the lamp 60 into correct alignment.

Light rays from the filament of lamp 60 are refracted when passing through first condenser lens 64 which is held in alignment by retaining tab 66 protruding from lamphouse rib member 68. After passing through first condenser lens 64, the light rays are again refracted upon their passage through second condenser lens 70, which, being of relatively large diameter, is formed with flats 71 as shown in FIG. 3, in order to maximize the illumination without increasing the thickness of the light source unit. The second condenser lens 70 is held in optical alignment with the other optical elements by means of retaining tab 72 protruding from lamphouse rib member 74. The lamphouse rib members 68 and 74 are fastened to lamphouse mounting bracket 58 by any suitable means, such as rivets or spot welds, calculated to retain them in a fixed position, since the optical alignment of the illumination system depends upon their alignment with mounting bracket 58. The light rays emerging from second condenser lens 70 are brought together at focal zone 76 through focusing cone 78 whose angle of convergence is chosen to be compatible with the light acceptance cone of fiber optics light conduit 28.

Light conduit 28 is positioned so that the polished face of its bundle of optical fibers meet focal zone 76 by virtue of the edges of light conduit ferrule 80 resting against internal shoulder 82 of coupling 84 held in position on case 42 by any suitable means such as machine screws 86.

The light emanating from lamp 60 is augmented by reflections from mirror 88 which is held in alignment by retaining tab 90 protruding from lamphouse rib member 92 which is affixed to lamphouse mounting bracket 58 by some suitable means such as rivets or spot welds. A second image of the lamp filament is formed by reflections from mirror 88 adjacent to the filament of lamp 60 so that the image forming rays continue along a path similar to the rays coming directly from the lamp filament, i.e., being refracted at first condenser lens 64 and at second condenser lens 70 to be focused into focal zone 76.

The lamphouse is additionally comprised of a cover 94 which is formed integrally with lamphouse mounting bracket 58 and serves as additional support for the lamphouse rib members 68, 74 and 92. The housing 94 extends from rib member 68 to rib member 92 at both the top and bottom of the lamphouse.

For sustained operation of my light source without discomfort to the patient or those intimately near it, it is desirable to provide means for dissipating heat which is a radiation by-product of the lamp 60. It is particularly important that heat not be conducted through the chair back to the patient and accordingly I have caused several members to cooperate for dissipating the heat.

Since the ordinary fan or air blower would be too bulky to fit into the small space available, an air impeller 96 of the miniature squirrel cage type is employed to rotate in a plane laterally of the lamphouse. Most commonly such an impeller is constructed with an intake aperture centrally positioned at one side of the squirrel cage rotor for an air inlet, with a motor on the other side of the squirrel cage to drive it for centrifugal distribution of the air through an outlet for channeling a stream of air. To conserve space, I have mounted the motor 98 on the case 42 beneath the impeller 96 and extending upward inside it. Motor shaft 100 extends upward through air baffle 101 and is secured by some suitable means, as a pin or a press fit, to hub 102 of impeller 96. Air is drawn into the vortex of impeller 96 through aperture 103 located beyond motor 98 in relation to air inlet port 44. Fan scroll 104 partly encircles impeller 96 and cooperates with air baffle 101 to constrain the air when the impeller 96 is activated. Portion 106 of the fan scroll 104 extends toward the position of the lamp 60, leaving fan scroll 104 in a generally spiral shape leading toward the lamp 60 and heat baffles 108 which receive radiated heat from the lamp. In operation cooling air is drawn through air inlet 34, if the unit is built-in to a practitioner's chair, through air inlet port 44, and across the motor 98 to carry away heat deriving from operation of the motor. The air passes through aperture 103 and is driven by impeller 96 along the unfolding spiral portion 106 over the lamp and heat baffles to carry heat away by convection through air outlet port 48 and down air duct 36.

It should be noticed that, in addition to the insulating effect of the chair's own material, I have provided three layers of material between the lamp and the outside of my light source to protect the patient from heat: heat baffles 108, cover 94 and case 42 (or cover 24).

While the main light conduit will provide excellent general illumination within a body cavity while causing a minimum of interference with the activities of a practitioner, it is sometimes desirable to have available an auxiliary light conduit for special purposes. For instance, if the body cavity in question is to be entered with an instrument, it may be desirable to have the instrument carry its own small light conduit for particular illumination of the point at which the instrument is to contact the patient. Such an instrument might be a dental drill which might carry such a light conduit for specific illumination of the tooth being drilled.

In order to provide for such an eventuality I have equipped coupling 84 with auxiliary light port 110. It receives auxiliary light conduit 112 and alignably holds it by some suitable means such as set screw 114. Auxiliary light conduit ferrule 116 protrudes into the focusing cone 78 of light rays, and the ferrule is formed with bend 118 to present its face squarely to the light source in order to maximize the illumination it is to receive.

I claim:

1. A compact, high-intensity light source for a fiber optics illumination system, comprising:
    a. a case having protrusions therein for mounting a lamphouse, and defining apertures in the walls of said case for receiving air, for expelling air, and for light egress;
    b. a lamphouse disposed within said case, and being demountable therefrom, comprising:
        1. a narrow mounting bracket having slots corresponding to said protrusions in said case, said mounting bracket being formed sealably with said case and defining an aperture for the passage of air;
        2. a socket disposed upon said mounting bracket for mounting and positioning a high-intensity lamp;
        3. a high-intensity lamp having a filament and a narrow envelope;
        4. a reflector mounted in optical alignment with said high-intensity lamp for reflecting light back toward the filament of said lamp; 5. an optical condenser lens mounted in optical alignment with said lamp, socket and reflector and focusing light from said lamp through said light egress aperture of said case;
        6. a housing mounted upon said mounting bracket for holding said reflector and said condenser, said housing defining a lamp chamber connecting with said mounting bracket at said air passage aperture, and connecting with said case at said air expelling aperture;
        7. a heat baffle mounted upon said housing within said lamp chamber for receiving heat from said lamp, said heat baffle comprising a sheet metal member depending from said housing to define an aperture across said lamp chamber for the passage of air around said sheet metal member to carry off heat therefrom through said air expelling aperture;
c. a flatly formed air impeller disposed within said case laterally from said lamphouse and adjacent to said air receiving aperture;
d. a fan scroll sealably disposed within said case around said air impeller and extending spirally toward said air passage aperture of said lamphouse mounting bracket, for guiding air from said air impeller to said air passage aperture; and
e. coupling means on said case for coupling a fiber optics illumination conduit to said case at said light egress aperture;

whereby said components are disposed to supply high-intensity light to said fiber optics illumination conduit while dispersing heat from said lamp.

* * * * *